US008626656B2

United States Patent
Abrams, Jr. et al.

(10) Patent No.: US 8,626,656 B2
(45) Date of Patent: Jan. 7, 2014

(54) SYSTEM AND METHOD FOR SECURING PAYMENT INSTRUMENTS

(75) Inventors: William Pierce Abrams, Jr., Newark, DE (US); James John Kelly, Hockessin, DE (US); Robert Dean Rowley, III, Garnet Valley, PA (US); Todd Adam Sandler, Gladwyne, PA (US); Daniel Lloyd Struble, Newark, DE (US); Rudolph Christian Wolfs, Hockessin, DE (US)

(73) Assignee: ING Direct N.V., Hoofddorp (NL)

( * ) Notice: Subject to any disclaimer, the term of this patent is extended or adjusted under 35 U.S.C. 154(b) by 253 days.

(21) Appl. No.: 12/768,876

(22) Filed: Apr. 28, 2010

(65) Prior Publication Data

US 2011/0270750 A1 Nov. 3, 2011

(51) Int. Cl.
*G06Q 40/00* (2012.01)
(52) U.S. Cl.
USPC ............................................................ 705/41
(58) Field of Classification Search
USPC ............................................................ 705/41
See application file for complete search history.

(56) References Cited

U.S. PATENT DOCUMENTS

| 4,630,201 | A | 12/1986 | White |
| 4,958,066 | A | 9/1990 | Hedgcoth |
| 5,754,653 | A | 5/1998 | Canfield |
| 6,859,699 | B2 * | 2/2005 | Carroll et al. ................ 701/32.6 |
| 7,069,250 | B2 * | 6/2006 | Meadow et al. ................ 705/75 |
| 2005/0149439 | A1 | 7/2005 | Suisa |
| 2008/0114658 | A1 * | 5/2008 | Weitzman ....................... 705/17 |
| 2008/0294977 | A1 * | 11/2008 | Friedman et al. ............. 715/224 |
| 2009/0218392 | A1 * | 9/2009 | Biskupski et al. ............ 235/375 |

* cited by examiner

*Primary Examiner* — Olabode Akintola
(74) *Attorney, Agent, or Firm* — Duane Morris LLP

(57) ABSTRACT

A system and method for securing financial information in payment instruments including generating a pseudorandom number sequence, generating an activation code, including a unique pseudorandom number of the sequence with each payment instrument of a plurality of payment instruments and issuing the plurality of payment instruments with the activation code to a customer. The activation code is associated with customer identifying information and each unique pseudorandom number of the sequence included with each payment instrument of the plurality of payment instrument. The plurality of payment instruments is activated with the activation code. A received payment instrument of the plurality of payment instruments is authenticated if the customer and the unique pseudorandom number of the sequence included on the received payment instrument are authenticated and if the plurality of payment instruments are activated.

24 Claims, 11 Drawing Sheets

SYSTEM AND METHOD FOR SECURING PAYMENT INSTRUMENTS

FIELD OF THE INVENTION

The present disclosure is directed generally to systems and methods for protecting sensitive financial information from theft and fraud. In particular, the present disclosure relates to systems and methods for securing payment instruments, such as checks, with improved security and fraud protection means.

DESCRIPTION OF THE RELATED ART

Safeguarding customer financial information against criminal fraudsters, forgers and cybercriminals represents a ongoing battle for consumers, businesses and financial institutions. Financial fraud can assume many forms including swindling, payment instrument fraud, debit or credit card fraud, real estate fraud, identity theft, deceptive telemarketing, or even money laundering. Personal computers continue to be a favorite target for fraudsters as they are typically poorly protected. Common attacks against consumers include the use of mirror or phishing sites, pharming sites, carding or skimming techniques, and crimeware such as Trojans. Although advancements in computer technology have offered more robust security features to consumers, businesses and financial institutions, they have also offered an easier operating environment for criminal fraudsters to manipulate financial instruments, such as payment instruments, in such a way as to deceive innocent victims expecting value in exchange for their money.

In particular, payment instrument fraud is one of the largest challenges facing businesses, consumers and financial institutions today Annual losses due to payment instrument fraud are estimated in the billions of dollars. This problem affects consumers who face financial losses and anxiety from the instant theft and also from the possible future repercussions with credit bureaus. The Uniform Commercial Code has placed increasing emphasis on the role of businesses and financial institutions in ensuring that their issued payment instruments are secure.

Victims of payment instrument fraud include financial institutions, businesses who accept and issue payment instruments, and the consumer. These crimes may begin with the theft of a financial document, for example, the theft of a blank check from a consumer's home or vehicle during a burglary, searching for a canceled or old check in the garbage, or removing a check a consumer may have mailed to pay a bill from the mailbox.

Common types of payment instrument fraud include forgery where an individual, such as a disgruntled employee of a financial institution or business, issues a check without proper authorization, counterfeiting where a payment instrument may be fabricated as a whole or duplicated, alteration where chemicals are used to remove or modify information on the payment instrument, paperhanging where consumers purposefully write checks on closed accounts, or kiting where a fraudster opens accounts at two or more financial institutions and uses "the float time" of available funds to create fraudulent balances. In particular, payment instrument compilations, such as paper checkbooks, are particularly prone to fraud due to check number guessing and limited controls placed on the physical paper checks within the checkbook.

Conventional systems and methods have utilized transaction specific information, such as a transaction amount or a particular type of transaction, to permit independent verification of a transaction and a payment instrument. For example, U.S. Pat. No. 4,630,201 to White discloses a paper check security feature in which the checks include unique transaction numbers. When a check is cleared, the bank compares the unique transaction number to a stored number to determine if the check number is being duplicated. White further discloses that a password protected portable device generates the transaction numbers. Additionally, U.S. Patent Publication Ser. No. 2005/0149439 to Suisa discloses a paper check security feature in which the checks include unique transaction numbers generated for a particular type of transaction. When a check is cleared, the bank compares the unique transaction number to a stored number to determine if the check number is being duplicated. Further by way of example, U.S. Pat. No. 5,754,653 to Canfield discloses a paper check security feature that uses a security code that is unique for each check and for each transaction involving a check. The security code is generated from the check sequence number preprinted on the check or the total transaction amount and a customer selected base code. Still further, U.S. Pat. No. 4,958,066 to Hedgcoth discloses a checkbook in which each check has a randomly assigned number. The number is used to verify the authenticity of the check by comparing it to digits on the payor's ATM card or separate dedicated, disposable card, but is not compared to a stored bank number during check clearing.

Conventional technologies instituted by financial institutions to minimize fraud and secure financial information have also included implementing procedures to actively monitor for customer check sequence numbers that are used out of sequence.

Additionally, some financial institutions have established policies to only process check sequence numbers that they know have been sent to a consumer. However, there remains a need in the art to overcome conventional limitations and provide a novel system and method for securing payment instruments, such as checks, with improved security and fraud protection capability.

SUMMARY OF THE INVENTION

One embodiment of the present invention provides a method for securing financial information including generating a pseudorandom number sequence, generating an activation code, including a unique pseudorandom number of the sequence with each payment instrument of a plurality of payment instruments, issuing the plurality of payment instruments with the activation code to a first party and activating the plurality of payment instruments with the activation code. The method may include verifying the authenticity of a payment instrument of the plurality of payment instruments using the activation code. The method may also include verifying the authenticity of a payment instrument of the plurality of payment instruments using the unique pseudorandom number of the sequence included with the payment instrument.

Another embodiment of the present invention provides a system for securing financial information, including a computer processor having a computer readable storage medium, the computer readable storage medium having instructions stored therein for executing on the processor, the instructions including generating an activation code for a plurality of payment instruments, generating a pseudorandom number sequence, including a unique pseudorandom number of the sequence with each payment instrument of the plurality of payment instruments, associating the activation code with each of the unique pseudorandom numbers of the pseudorandom number sequence included with each payment instrument of the plurality of payment instruments, associating the activation code with information for identifying the first party, storing the activation code with each of the unique pseudorandom numbers of the pseudorandom number sequence included with each payment instrument of the plurality of payment instruments and the information for identifying the first party in a file of a second party and activating the plurality of payment instruments with the activation code. The system may also include a means for issuing the plurality of payment instruments with the activation code to a first party. The computer readable storage medium may also include instructions stored therein for executing on the processor, the instructions including verifying the authenticity of a payment instrument of the plurality of payment instruments using the activation code and verifying the authenticity of a payment instrument of the plurality of payment instruments using the unique pseudorandom number of the sequence included with the payment instrument.

A further embodiment of the present invention provides a method for authenticating a check including generating a pseudorandom number sequence, generating an activation code, including a unique pseudorandom number of the sequence with each check of a plurality of checks issuing the plurality of checks with the activation code to a first party, associating the activation code with each unique pseudorandom number of the pseudorandom number sequence included with each check of the plurality of checks, associating the activation code with information for identifying the first party, storing the activation code with the pseudorandom number sequence and the information for identifying the first party in a file of a second party, receiving a check of the plurality of checks having at least a portion of the information for identifying the first party and the unique pseudorandom number of the sequence included with the check, determining a status of activating the plurality of checks using the at least a portion of the information for identifying the first party, the stored activation code, and at least a portion of the stored information for identifying the first party, authenticating the first party with the received at least a portion of the information for identifying the first party and at least a portion of the stored information for identifying the first party, authenticating the unique pseudorandom number of the sequence included with the check with the received at least a portion of the information for identifying the first party, the stored information for identifying the first party and the stored unique pseudorandom numbers of the pseudorandom number sequence and authenticating the received check of the plurality of checks if the first party and the unique pseudorandom number of the sequence included with the check are authenticated and if the plurality of checks have been activated.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

DETAILED DESCRIPTION OF THE EMBODIMENTS OF THE INVENTION

With reference to the Figures where like elements have been given like numerical designations to facilitate an understanding of the present invention, the various embodiments of a system and method for securing financial information in payment instruments, such as checks, is provided.

The present disclosure may be utilized to secure financial information in payment instruments provided to customers of financial institutions. A financial institution may be, but is not limited to, a bank or other similar entity. The present disclosure may utilize a computer-based system and method that provides financial institution customers access to numerous online banking services offered by online banking service providers based on customer information profiles that may be developed over time as described below. "Online" may mean connecting to or accessing account information from a location remote from the financial institution or a branch of the financial institution. Alternatively, "online" may refer to connecting or accessing an electronic network (wired or wireless) via a computer as described below. In exemplary embodiments, the method and system are web-based, as described below.

The Internet is a worldwide system of computer networks—a network of networks in which a user at one computer or other device connected to the network can obtain information from any other computer and communicate with users of other computers or devices. The most widely used part of the Internet is the World Wide Web (often-abbreviated "WWW" or called "the Web").

One of the most outstanding features of the Web is its use of hypertext, which is a method for cross-referencing. In most Web sites, certain words or phrases appear in text of a different color than the surrounding text. This text is often also underlined. Sometimes, there are hot spots, such as buttons, images, or portions of images that are "clickable." Clicking on hypertext or a hot spot causes the downloading of another web page via a protocol such as hypertext transport protocol (HTTP). Using the Web provides access to millions of pages of information. Web "surfing" is done with a Web browser, the most popular of which presently are Apple Safari and Microsoft Internet Explorer. The appearance of a particular website may vary slightly depending on the particular browser used. Versions of browsers have "plug-ins," which provide animation, virtual reality, sound, and music. Interpreted programs (e.g., applets) may be run within the browser.

Figure 1:
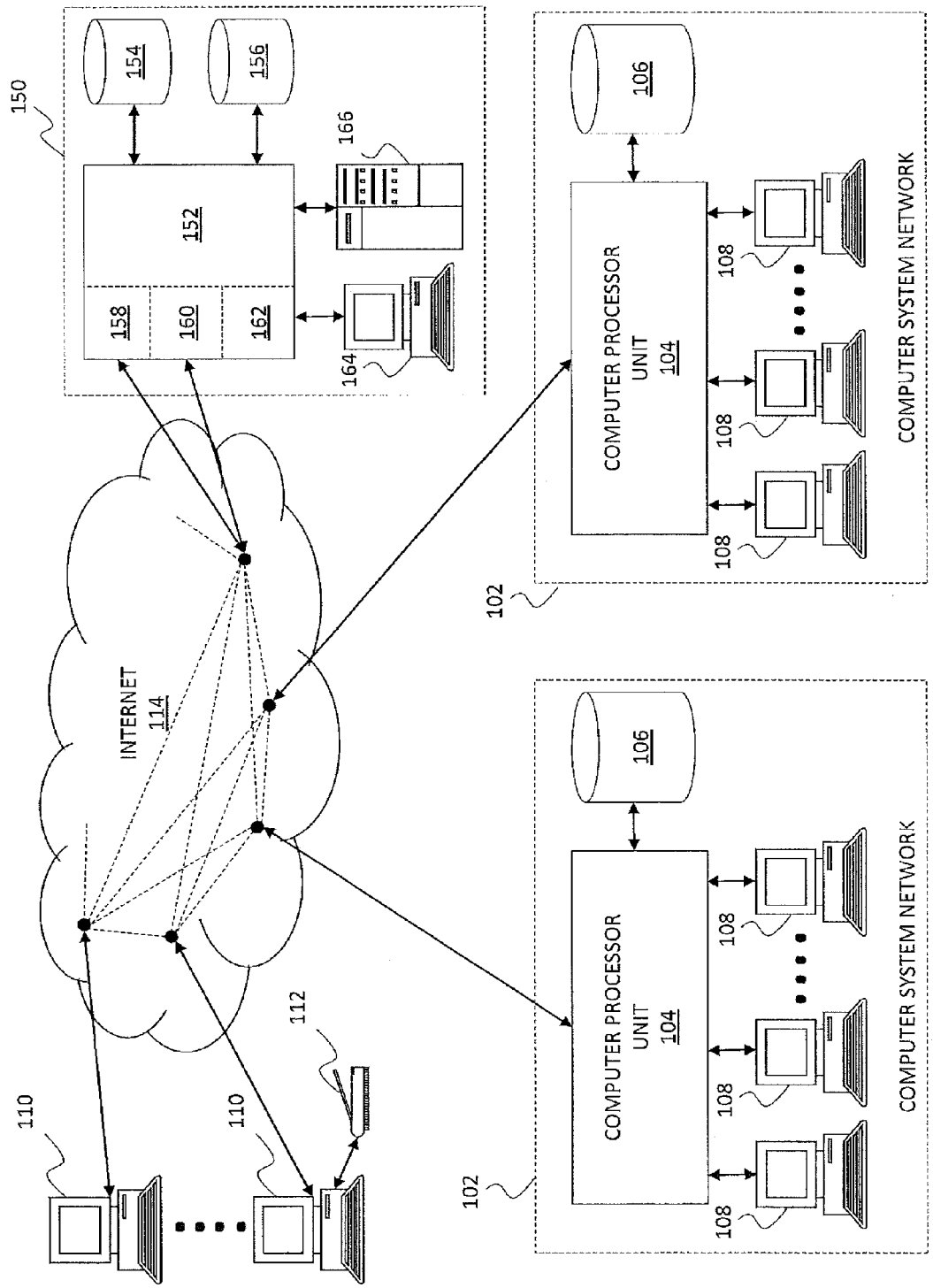
FIG. 1 is a diagram of an online banking access system connected to a plurality of interconnected computer system networks and devices according to an embodiment of the present disclosure.

FIG. 1 shows an online banking access system 150 connected to a plurality of interconnected computer system networks 102 and devices 110. Each computer system network 102 may include a corresponding local computer processor unit 104, which is coupled to a corresponding local data storage unit 106 and to local network user terminals 108. A computer system network 102 may be a local area network (LAN) or part of a wide area network (WAN), for example. The online banking access system 150 and local computer processor units 104 are selectively coupled to a plurality of user devices 110 through Internet 114. Each of the plurality of user devices 110 and local user terminals 108 (collectively, user terminals) may have various devices connected to their local computer systems, such as scanners, barcode readers, printers, finger print scanners, mouse devices, keyboards, and other interface devices 112.

Online banking access system 150 includes a processing unit 152 coupled to one or more data storage units 154, 156. The processing unit 152 provides front-end graphical user interfaces (GUI), e.g., customer GUI 158 and online banking service provider GUI 160, as well as back-end GUIs 162 to a user's terminal 108, 110 or to local computer 164. The GUIs can take the form of, for example, a webpage that is displayed using a browser program local to the user terminal 108, 110, or to local computer 164. It is understood that the online banking access system 150 may be implemented on one or more computers 164, servers 166, or like devices. Front- and back-end GUIs 158, 160, 162 are preferably portal pages that includes various content retrieved from the one or more data storage devices 154, 156. As used herein, "portal" is not limited to general-purpose Internet portals, such as YAHOO! or GOOGLE but also includes GUIs that are of interest to specific, limited audiences and that provide the user access to a plurality of different kinds of related or unrelated information, links and tools as described below. "Webpage" and "website" may be used interchangeably herein.

A user may gain access to online banking access system 150 by using a user device 108, 110, 164, programmed with a Web browser or other software, to locate and select (such as by clicking with a mouse) a particular webpage. The content of the webpage is located on the one or more data storage devices 154, 156. The user devices 108, 110 may be microprocessor-based computer terminals, pagers that can communicate through the Internet using the Internet Protocol (IP), Kiosks with Internet access, connected personal digital assistants or PDAs (e.g., a PALM device manufactured by Palm, Inc., IPAQ device available from Compaq, iPHONE from Apple or BLACKBERRY from RIM), or other devices capable of interactive network communications, such as an electronic personal planner. User devices 108, 110 may also be wireless devices, such as a hand-held unit (e.g., a cellular telephone or a portable music player such as an iPod) that connect to, and communicate through, the Internet using a wireless access protocol (WAP).

The system and method described herein may be implemented by utilizing at least a part of the system 150 described above in connection with FIG. 1. It should be apparent to one of ordinary skill in the art that the system may be incorporated in a LAN, in a WAN, or through an Internet 114 based approach, such as through a hosted or non-hosted application service, or through a combination thereof. The functionality of the method may be programmed and executed by at least one computer processor unit 152, with necessary data and graphical interface pages as described below stored in and retrieved from a data storage unit 154, 156. A user can access this functionality using a user device 108, 110.

As mentioned above, online banking access system 150 may provide separate features and functionality for front-end users, including customers and online banking service provider users, as well as back-end users that manage the online banking access system 150. For the purposes of this document, a "customer" is an individual or organization that signs up for or otherwise takes advantage of an online banking service, and an "online banking service provider" is an individual or organization, such as a financial institution, that provides one or more online banking services to customers. Accordingly, the customers are actual customers of the online banking service providers.

Figure 2:
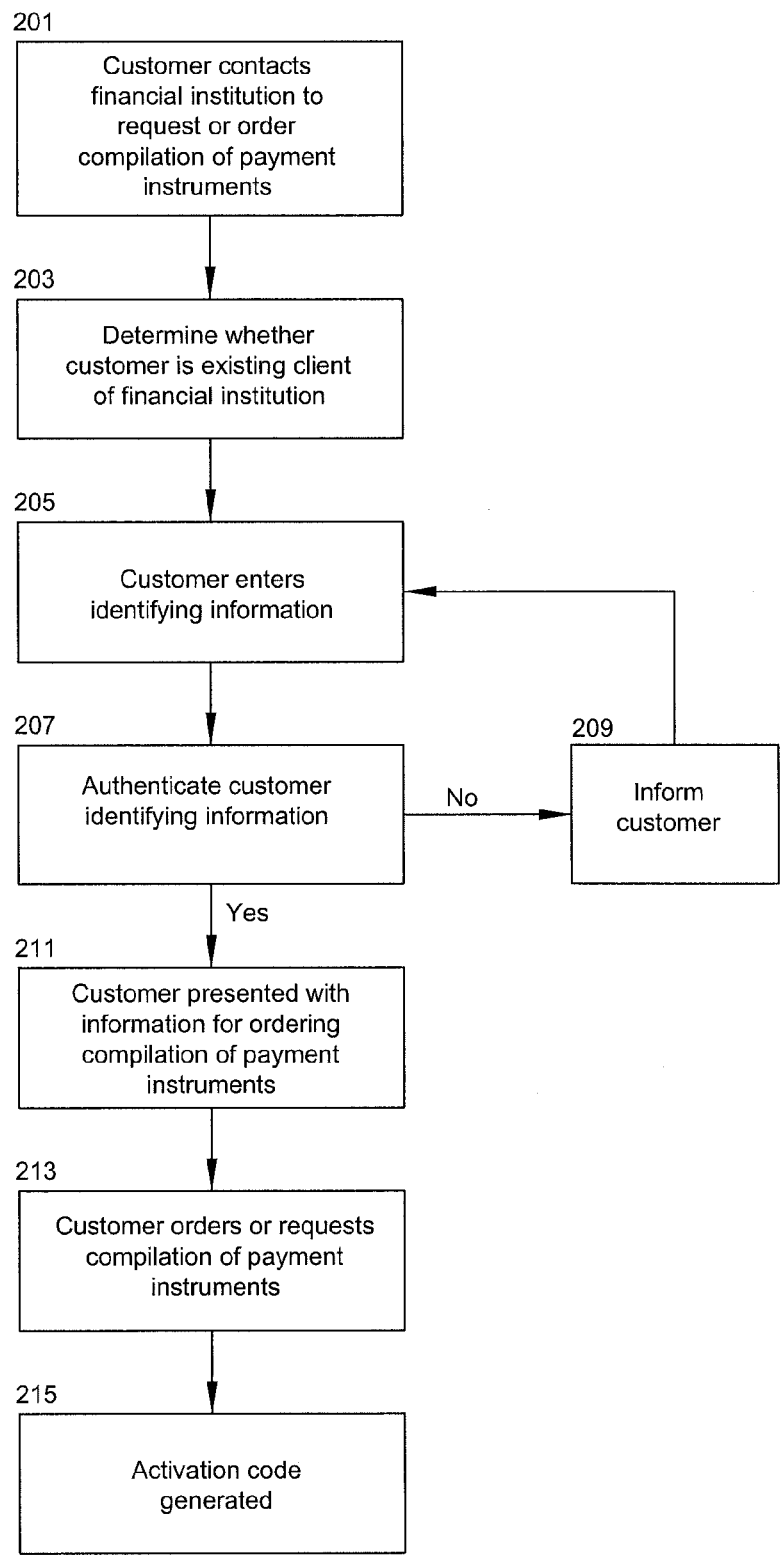
FIG. 2 is a flow chart of for a method for securing financial information according to an embodiment of the disclosure.

With attention now drawn to FIG. 2, a flow diagram 200 for a method for securing financial information according to an embodiment of the disclosure is presented. In FIG. 2, at block 201 a customer may contact a financial institution to request or order a compilation of payment instruments, such as a checkbook, from the financial institution. For example, the checkbook may be a paper checkbook or an electronic checkbook. As can readily be appreciated, the present disclosure is applicable to a number of payment instruments and compilations of payment instruments, and that a check and compilation of a plurality of checks commonly referred to as a checkbook are only an exemplary form of a payment instrument or a compilation of payment instruments that are contemplated by the present invention.

One skilled in the art will recognize that the customer may order a checkbook by contacting the financial institution through a wide variety of methods including, but not limited to, telephone, electronic mail, physical mail or by entering the financial institution's electronic system for online check ordering. As described above, the financial institution's electronic system for online check ordering may be a website provided by the financial institution's online banking access system 150 that the customer may access via a public or private network. The customer may enter the website a number of ways (i.e., the customer's entrance into the financial institution's website may be "path sensitive", which may have implications as discussed further below) such as via a public network, via a link from another account the customer may have with the financial institution, via a notice or alert sent to the customer by the financial institution, via an e-mail advertisement sent to the customer by the financial institution, in response to a receipt of a promotional advertisement, etc.

At block 203, a determination may be made as to whether the customer is an existing client of the financial institution. In an embodiment, a determination may be made as to whether the customer is an existing online client of the financial institution. This determination may be based on information from block 201 or other information provided by the customer or from another source, including records or files possessed by, or stored at, the financial institution, including, but not limited to, at data storage units 154, 156. In an embodiment, the determination at block 203 may be made as to whether the customer is an existing offline client of the financial institution or both an online and offline client of the financial institution. An offline client may include the situation where the customer currently does business with the financial institution but not through the financial institution's online system.

If the customer is an existing online client of the financial institution, then at block 205, the customer enters information (which may sometimes be referred to herein as information for identifying a party or information for identifying a customer) such as, for example, a username and password. This information may typically be entered and transmitted to the financial institution using a computer such as, for example, through customer's terminal 108, 110 or local computer 164. Alternatively, as would be understood by those of skill in the art, other information may be entered or used in place of a username and password. For example, the information for identifying a customer may include the customer's name, the customer's mailing address, the customer's electronic mailing address, the customer's account number, the customer's social security number, the customer's bank's name, the customer's bank's identification number, the customer's bank's routing transit number, the website login information assigned to the customer by the financial institution or selected by the customer when creating an online account with the financial institution, a digital signature, information stored in a security token such as a soft token, hard token, key fob, or the like, a personal identification number (PIN), source IP address, a session identification, a session start time, a knowledge based authentication (KBA) status or any combination thereof. In an embodiment, since the customer is an existing online client of the financial institution only a limited amount or portion of information need be entered by the customer. In an exemplary embodiment, the information sent between the customer and the financial institution is encrypted using a network security protocol known in the art such as, for example, Secure Socket Layer (SSL) or Transport Layer Security (TLS). If the customer is an existing offline client of the institution, the customer provides identifying information, at block 205, such as, for example, the customer's name, customer's mailing address, the customer's electronic mailing address, the customer's account number, the customer's social security number, the customer's bank's name, the customer's bank identification number, the customer's bank's routing transit number, telephone call-in information assigned to the customer by the financial institution or selected by the customer during account set-up, a call-in password, a call-in PIN, or any combination thereof. In an embodiment, since the customer is an existing offline client of the financial institution, only a limited amount or portion of information need be entered by the customer.

At block 207, the information provided by the customer at block 205 may be authenticated by any appropriate method known in the art. For example, the information provided by the customer at block 205 may be compared to information stored for the customer in records or files possessed by, or stored at, the financial institution, including, but not limited to, at data storage units 154, 156. If the information provided by the customer at block 205 is not authenticated, the financial institution may inform the customer that the information provided at block 205 is incorrect by any appropriate method known in the art including, for example, by displaying an error message on the customer's computer screen at block 209 and looping the process back to block 205. If the information provided by the customer at block 205 is authenticated, then the financial institution may, at block 211, present to the customer (e.g. by displaying information on a webpage presented to the customer) at, for example, the customer's terminal 108, 110 or local computer 164, information for ordering a compilation of payment instruments. In an embodiment, the financial institution may provide to the customer, at block 211, information for ordering a checkbook by telephone, electronic mail, physical mail, or any other correspondence mechanism.

The information for ordering a checkbook presented to the customer at block 211 may be dynamically presented based at least partially on the information provided by the customer at block 201 or 205 or from another source, including records or files possessed by, or stored at, the financial institution, including, but not limited to, at data storage units 154, 156. For example, the information for ordering the checkbook may include a type of account held by the customer at the financial institution including, but not limited to, a savings account, checking account, money market account, etc. In an embodiment, the information for ordering the checkbook may include the name of the primary account holder, the name of a joint account holder, an account number of a checking, savings, money market or other account, a physical or electronic mailing address of the customer, terms and conditions for ordering the checkbook, etc. The terms and conditions, as is known in the art, typically includes information appropriate for a product to be selected or ordered by a customer, in this case at block 211, and may include information, such as, but not limited to, minimum balance requirements, payment rules, interest rates charged, overdraft charges, late fee applicability, etc. In an embodiment, the information for ordering the checks may include an option for renewal of a previous order or request made by the customer. In an embodiment, the customer may be asked to verify the accuracy of the information presented at block 211 and/or accept terms and conditions presented at block 211 prior to ordering or requesting the checkbook. In a further embodiment, the customer may perform edits to the information presented at block 211 to ensure accuracy. In another embodiment, the information for ordering the checkbook may include a link to a third party provider site, including but not limited to, a check provider or check printing service provider. At block 213, the customer makes a selection from the information for ordering the checkbook provided or presented at block 211 and orders or requests the checkbook.

Upon receipt of the request or order from the customer, at block 215, an activation code is generated by the financial institution. As used herein, an activation code is a random or pseudorandom code generated by any appropriate method known in the art, including at least one or more of a number, letter or symbol, or combination thereof, and that is unique to the checkbook ordered or requested by the customer at block 213. For example, an activation code for a requested checkbook may be generated as "e429ab". In an embodiment of the present invention, computer processing unit 152 may be programmed to execute an activation code generating algorithm that returns a sequence of apparently non-related numbers, letters, symbols or combinations thereof each time the program is called. In an alternate embodiment, the activation code may be generated by a third party check provider or check printing service provider.

Figure 3:
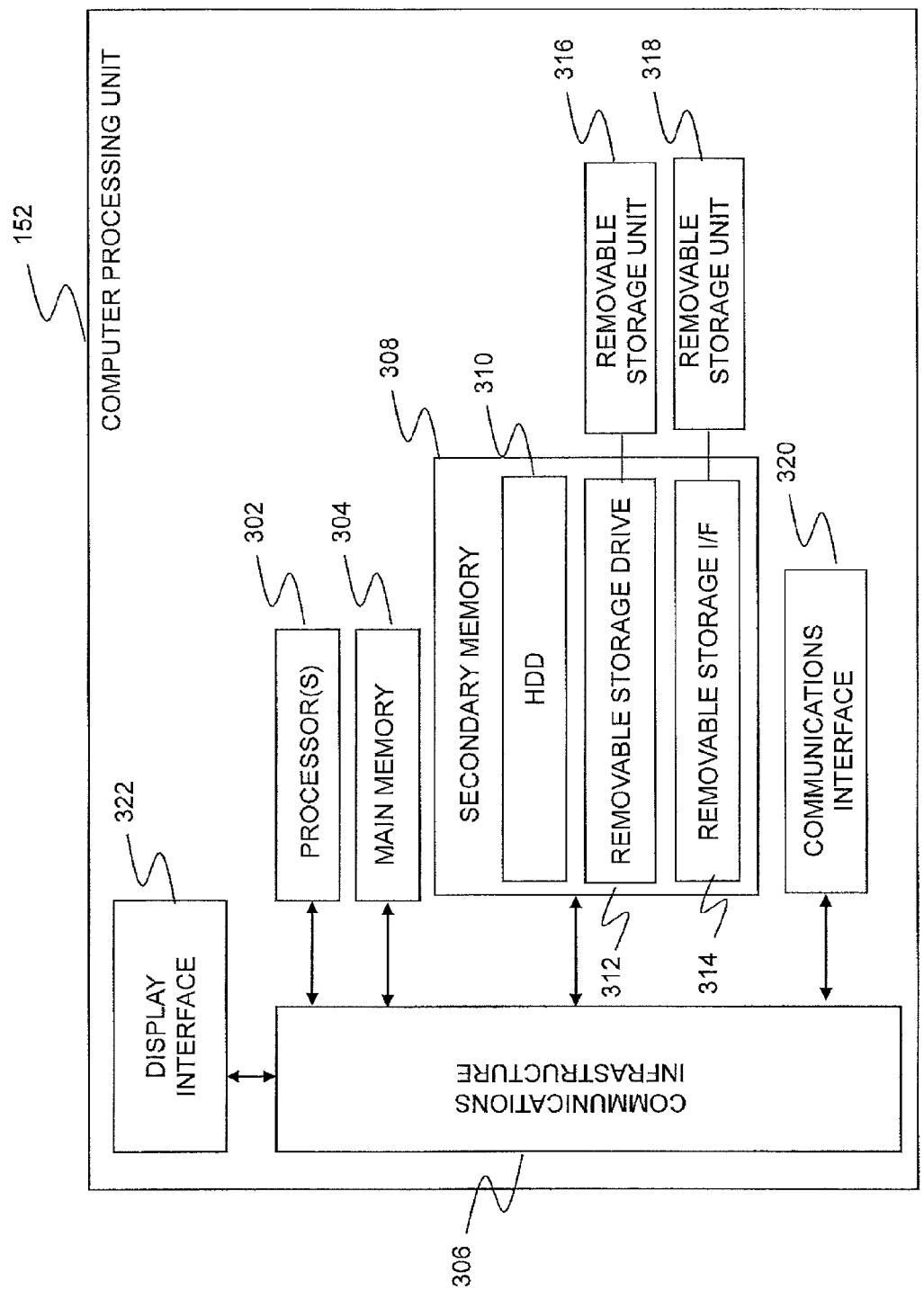
FIG. 3 is a diagram of an illustrative example of an architecture of a computer processing unit with the present invention.

FIG. 3 illustrates an example of an architecture of a computer processing unit 152 configured to implement the algorithms associated with the present disclosure. As illustrated in FIG. 3, computer processor unit 152 may include one or more processors 302. The processor 302 is connected to a communication infrastructure 306 (e.g., a communications bus, cross-over bar, or network). As discussed above, computer processing unit 152 may include a display interface 422 that forwards graphics, text, and other data from the communication infrastructure 406 (or from a frame buffer not shown) for display on the front- and back-end GUIs 158, 160, 162 and as retrieved from the one or more data storage devices 154, 156.

Computer processing unit 152 may also include a main memory 304, such as a random access memory (RAM), and a secondary memory 308. The secondary memory 308 may include, for example, a hard disk drive (HDD) 310 and/or removable storage drive 312, which may represent a floppy disk drive, a magnetic tape drive, an optical disk drive, or the like. The removable storage drive 312 reads from and/or writes to a removable storage unit 316. Removable storage unit 316 may be a floppy disk, magnetic tape, optical disk, or the like. As will be understood, the removable storage unit 316 may include a computer readable storage medium having stored therein computer software and/or data.

In alternative embodiments, secondary memory 308 may include other similar devices for allowing computer programs or other instructions to be loaded into computer processing unit 152. Secondary memory 308 may include a removable storage unit 318 and a corresponding interface 314. Examples of such removable storage units include, but are not limited to, USB or flash drives, which allow software and data to be transferred from the removable storage unit 318 to computer processing unit 152.

Computer processing unit 152 may also include a communications interface 320. Communications interface 320 allows software and data to be transferred between computer processing unit 152 and external devices. Examples of communications interface 320 may include a modem, Ethernet card, wireless network card, a Personal Computer Memory Card International Association (PCMCIA) slot and card, or the like. Software and data transferred via communications interface 320 may be in the form of signals, which may be electronic, electromagnetic, optical, or the like that are capable of being received by communications interface 320. These signals may be provided to communications interface 320 via a communications path (e.g., channel), which may be implemented using wire, cable, fiber optics, a telephone line, a cellular link, a radio frequency (RF) link and other communication channels.

In this document, the terms "computer program medium" and "computer readable storage medium" refer to media such as removable storage drive 312, or a hard disk installed in hard disk drive 310. These computer program products may provide software to computer processing unit 152. Computer programs (also referred to as computer control logic) are stored in main memory 304, secondary memory 308 and/or data storage devices 154, 156. Computer programs may also be received via communications interface 320. Such computer programs, when executed by a processor, enable the computer processing unit 152 to perform features of the methods discussed herein. For example, main memory 304, secondary memory 308, data storage devices 154, 156 or removable storage units 316 or 318 may be encoded with computer program code for performing the activation code algorithm.

In an embodiment implemented using software, the software may be stored in a computer program product and loaded into computer processing unit 152 using removable storage drive 312, hard drive 310, or communications interface 320. The software, when executed by a processor 302, causes the processor 302 to perform the functions of the activation code algorithm described herein. In another embodiment, the activation code algorithm may be implemented primarily in hardware using, for example, hardware components such as a digital signal processor comprising application specific integrated circuits (ASICs). In yet another embodiment, the activation code algorithm is implemented using a combination of both hardware and software.

As discussed above, at block 215, the financial institution may generate an activation code by any appropriate method known or used in the art. For example, it is well-known in the art to program and execute a standard C RAND or RANDS function, or the PHP hyperext preprocessor functions microtine or mt_rand, or the Unix function /dev/random, or the Java function SecureRandom, to return a pseudorandom number or alphanumeric sequence within a specified range. It is understood that a pseudorandom number or alphanumeric sequence generator should produce a pseudorandom sequence with a period that is long enough so that a finite sequence of reasonable length is not periodic. It is also well known that all pseudorandom number or alphanumeric sequence generators have an internal memory or state and that the size of the state is the value that determines the strength of the pseudorandom number or alphanumeric sequence generator, where an n-bit state can produce at most $2^n$ different values. The strength, or ability of the pseudorandom sequence generator to resist a brute force attack by a cryptanalyst, of the output of the pseudorandom number or alphanumeric sequence generator is also commonly associated with the information entropy of the process that produced the pseudorandom sequence. This information entropy (H) is conventionally measured in bits and is commonly calculated as: $H=L \log_2 N$ where L is the number of letters, numbers or symbols in the sequence and N is the number of possible letters, numbers or symbols. See, e.g. National Institute of Standards and Technology Special Publication 800-63, Electronic Authentication Guideline, Appendix A; Bruce Schneier, Applied Cryptography, John Wiley & Sons, 1996, Chapter 11, Mathematical Background, p. 233-237. For example, in a pseudorandom alphanumeric sequence, where each alphanumeric character in the sequence is produced independently, and where the number of possible letters, numbers or symbols includes all letters in the Latin alphabet from a-z (26), A-Z (26) and all Arabic numerals from 0-9 (10), the entropy per symbol would be calculated as $H=\log_2 N$ or $\log_2 (52)$ or 5.70 bits per symbol. It is well known in the art to select L and N based on a desired information entropy, thus, one skilled in the art would understand to select those values for the activation code based on a desired information entropy.

It is also understood that to be cryptographically secure, a pseudorandom sequence must be unpredictable where a secret key, or seed, is used to set the initial state of the pseudorandom sequence generator. Key management of the secret key or seed may be implemented by the financial institution in any method known in the art and should be at least in compliance with the financial industry standards set forth by the Accredited Standards Committee X9. In addition to employing a secret key, there are a wide variety of known methods to generate the seed for pseudorandom sequence generation. For example, the standard C function RAND may be seeded using the time function, although time of day is often not used as a seed due to its susceptibility to cryptographic attacks. Additionally, by way of example, Open SSL may use the function RAND_screen( ) to hash the contents of the screen to generate a seed. Further by way of example, the Linux random number generator may collect data from a variety of sources, including mouse, keyboard and other interrupts to seed a random number generator. Furthermore, it is well known in the art to combine the seed and a counter output and hash the output with a one-way hashing functions such as MD5 or SHA-1 to generate a cryptographically secure pseudorandom sequence.

In an embodiment, at block 215, a third party check provider or check printing service provider may generate an identical activation code for the customer requested checkbook at block 213. It is understood that the financial institution and third party check provider or check printing service provider should use identical activation code algorithms, identical pseudorandom sequence generators in synchronism and an identical seed previously supplied in advance of the activation code generation. In an embodiment, the activation codes generated by the financial institution and third party check provider or check printing service provider may be verified by any secure communication method known in the art including secure communication methods employing asymmetric or symmetric encryption techniques, message authentication codes, secure hashing algorithms, and/or, as discussed above, a combination thereof using, for example, a network security protocol known in the art such as SSL or TLS where the information sent between the financial institution and third party check provider or check printing service provider is encrypted. In an alternate embodiment, a third party check provider or check printing service provider may generate the activation code for the customer requested checkbook at block 213.

Figure 4:
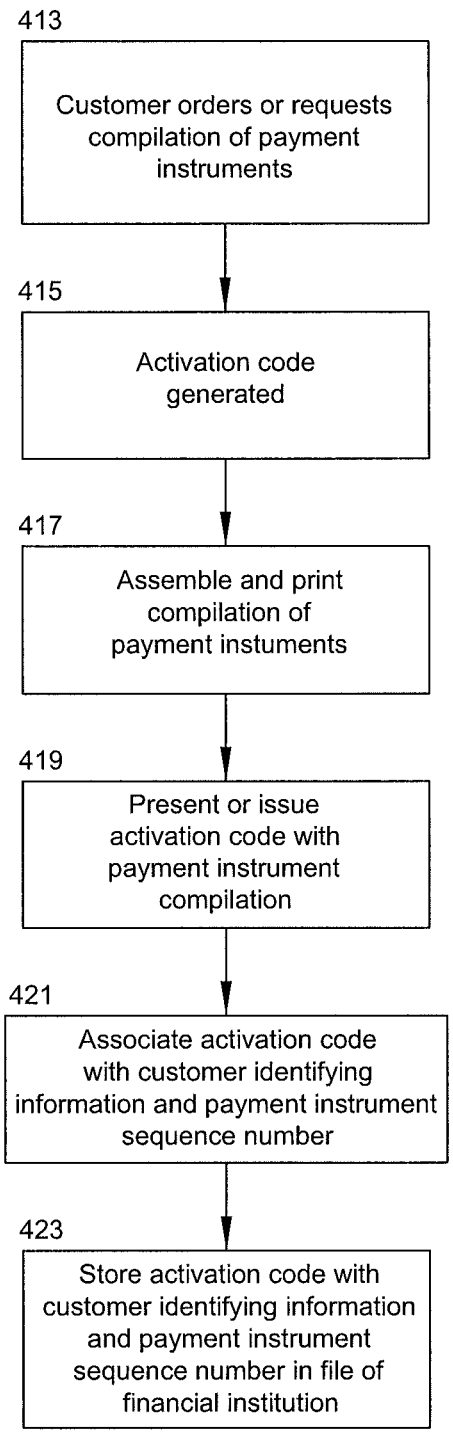
FIG. 4 is a flow chart illustrating a method for securing payment instruments according to an embodiment of the present invention.

FIG. 4 illustrates a flow chart illustrating a method for securing payment instruments according to an embodiment of the present invention. In the present embodiment and as discussed above, the customer may order or request a checkbook at block 213. Upon receipt of the request or order from the customer, at block 215, an activation code is generated by the financial institution using any appropriate method known or used in the art. As discussed above, in an alternate embodiment, the activation code, or an identical activation code, may be generated by a third party check provider or check printing service provider. At block 417, in embodiments including a compilation of paper payment instruments, such as a paper checkbook, each of the plurality of paper checks in the checkbook is printed, assembled and united into a booklet form by the financial institution, third party check provider or third party check printing service provider as requested by the customer at block 213. In embodiments including a compilation of electronic financial instruments, such as an electronic checkbook, each of the plurality of electronic checks is created, electronically assembled and electronically united into an electronic checkbook file by the financial institution or third party check provider at block 417, as requested by the customer at block 213.

In an embodiment, at block 419, the activation code is issued to an address of the customer stored or possessed by the financial institution at, for example, records or files at data storage units 154, 156. The address of the customer may include, but is not limited to, a physical mailing address or electronic mailing address. In an embodiment, the customer may be requested to verify the physical mailing address or electronic mailing address that is stored or possessed by the financial institution prior to requesting or ordering a checkbook at block 213. In an exemplary embodiment using a paper checkbook, at block 419, the activation code may be mailed to an address of the customer stored by the financial institution, third party check provider or third party check printing service provider with the printed checkbook that was ordered by the customer at block 213. The activation code may be printed on a card or a sticker with instructions to the customer such as, for example, "Use the below code to activate your checkbook". The card or sticker may also include instructions for contacting the financial institution to activate the checkbook including, but not limited to, a website address, secure electronic mailing address, or telephone number, and may also include instructions for activating the checkbook once contact has been established with the financial institution.

Figure 5:
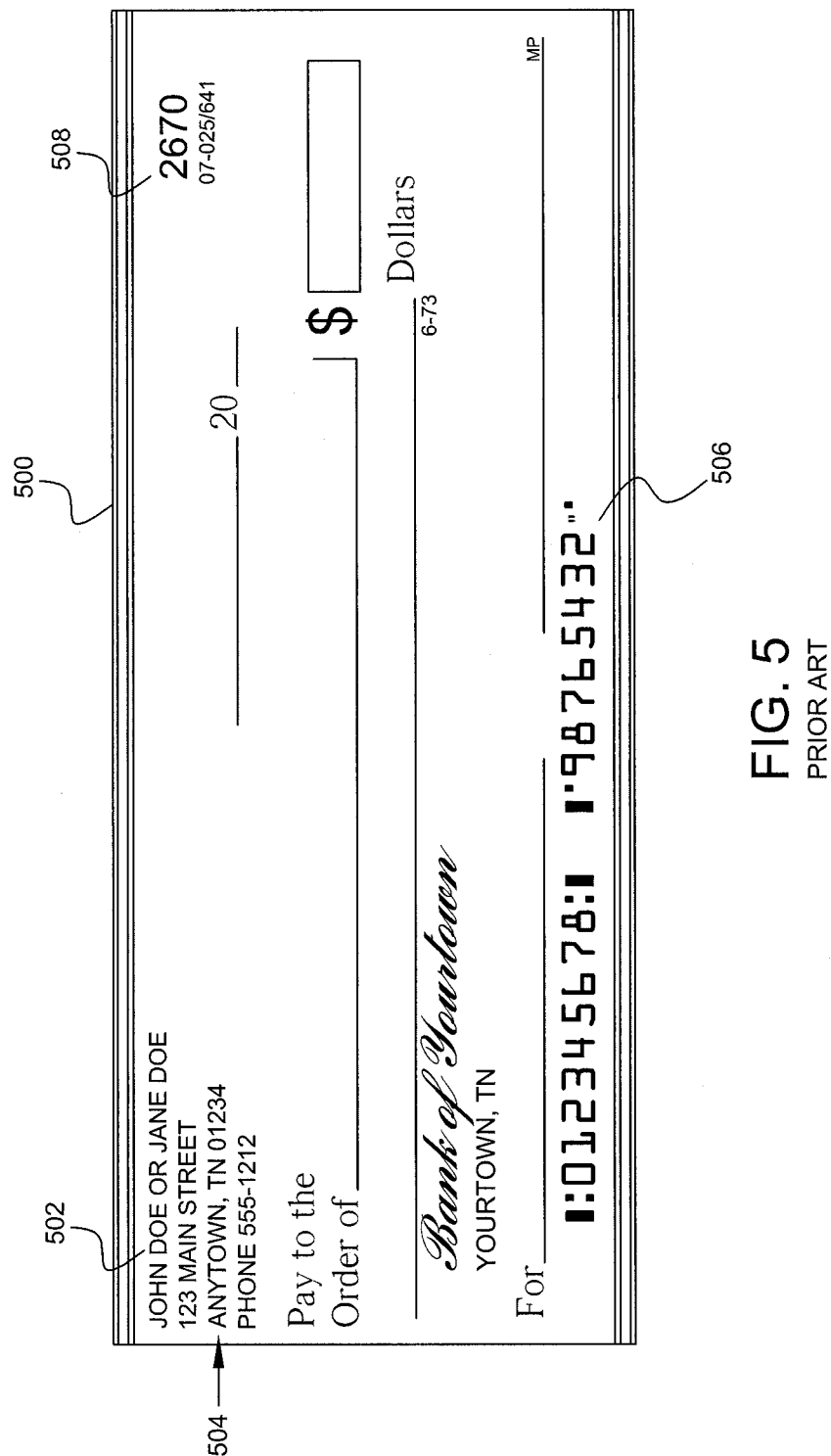
FIG. 5 is a diagram of a conventional paper check.

At block 421, the activation code generated for the customer's checkbook at block 215 is associated with at least a portion of the standard indicia, for example, the traditional check sequence number, for each of the plurality of checks in the checkbook ordered by the customer at block 213. With reference to FIG. 5, a conventional paper check 500 is illustrated. Standard indicia on a conventional paper check 500 includes a customer name 502, a customer address 504, a customer account number 506 printed on the check in traditional Magnetic Ink Character Recognition (MICR) format, and a check sequence number 508. As discussed above, the generated activation code is unique to the plurality of checks in the checkbook ordered by the customer at block 213. In an embodiment, at block 421, the activation code is associated with the traditional check sequence number for each of the plurality of checks in the customer's checkbook ordered by the customer at block 213. At block 421, the activation code generated for the customer's checkbook at block 215 may be associated with identifying information for the customer. The identifying information for the customer may be stored in records or files possessed by, or stored at, the financial institution, including, but not limited to, at data storage units 154, 156. In another embodiment, the customer's identifying information may be stored in records or files possessed by, or stored at, a third party check provider or third party check printing service provider.

The stored customer identifying information may be based on whether the customer is an existing offline customer or existing online customer of the financial institution. As discussed above, customer identifying information may include, but is not limited to, a username, a password, the customer's name, the customer's mailing address, the customer's electronic mailing address, the customer's account number, the customer's social security number, the customer's bank's name, the customer's bank's identification number, the customer's bank's routing transit number, the website login information assigned to the customer by the financial institution or selected by the customer when creating an online account with the financial institution, a digital signature, information stored in a security token such as a soft token, hard token, key fob, or the like, a personal identification number (PIN), source IP address, a session identification, a session start time, a knowledge based authentication (KBA) status, telephone call-in information assigned to the customer by the financial institution or selected by the customer during account set-up, a call-in password, a call-in PIN, or any combination thereof.

At block 423, the generated activation code may be stored in the appropriate customer's records or files possessed by, or stored at, the financial institution, including, but not limited to, at data storage units 154, 156 with at least a portion of the customer identifying information and at least a portion of the standard indicia, for example, the traditional check sequence number, for each of the plurality of checks in the checkbook ordered by the customer at block 213. In another embodiment, at block 423, the activation code, at least a portion of the customer identifying information and at least a portion of the standard indicia, for example, the traditional check sequence number, for each of the plurality of checks in the checkbook ordered by the customer at block 213, may be stored in the appropriate customer's records or files possessed by, or stored at, a third party check provider or third party check printing service provider.

Figure 6:
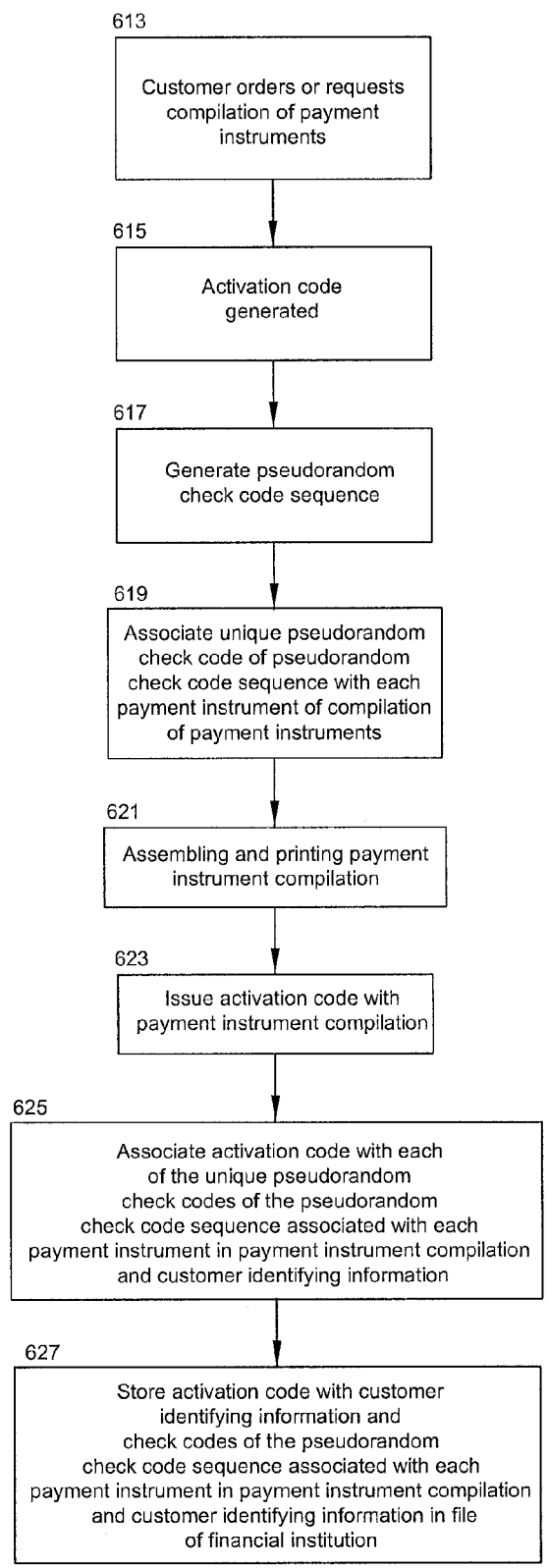
FIG. 6 is a flow chart illustrating a method for securing payment instruments according to an embodiment of the present invention.

With reference to FIG. 6, a preferred embodiment of the present disclosure is illustrated. As discussed above, the customer may order or request a checkbook at block 213. Upon receipt of the request or order from the customer, at block 215, an activation code may be generated by the financial institution using any appropriate method known or used in the art. As discussed above, in an alternate embodiment, the activation code, or an identical activation code, may be generated by a third party check provider or check printing service provider. In the present embodiment, at block 617, and upon receipt of the request or order from the customer at block 215, a pseudorandom check code sequence is generated by the financial institution. Each check code in the pseudorandom check code sequence includes at least one or more of a number, letter or symbol, or combination thereof, that is unique to each check of the plurality of checks in the checkbook ordered by the customer at block 213. The pseudorandom check code sequence may be generated by any appropriate method known in the art. For example, a pseudorandom check code of the pseudorandom check code sequence for a requested checkbook may be generated as "34", "3216", "183", "9", "6543", "74a5", or "37ps2". In a preferred embodiment, the pseudorandom check code sequence is generated by a pseudorandom number generator (PRNG) and includes a sequence of pseudorandom codes of variable length numeric values. In an embodiment of the present disclosure, at least a portion of a pseudorandom check code of the generated pseudorandom check code sequence may include the activation code. In an embodiment of the present invention, computer processing unit 152 may also be programmed to execute a pseudorandom check code sequence generating algorithm that returns a sequence of pseudorandom line check codes each time the program is called. In a preferred embodiment, the computer processing unit 152 may also be programmed to execute a pseudorandom check code sequence generating algorithm that returns a sequence of pseudorandom check codes each time the program is called. In an alternate embodiment, the pseudorandom check code sequence may be generated by a third party check provider or check printing service provider.

As discussed above, in embodiments implemented using software, the software may be stored in a computer program product and loaded into computer processing unit 152 using removable storage drive 312, hard drive 310, or communications interface 320. The software, when executed by a processor 302, causes the processor 302 to perform the functions of the pseudorandom check code sequence algorithm described herein. In another embodiment, the pseudorandom check code sequence algorithm may be implemented primarily in hardware using, for example, hardware components such as a digital signal processor comprising application specific integrated circuits (ASICs). In yet another embodiment, the pseudorandom check code sequence algorithm is implemented using a combination of both hardware and software.

As discussed above, at block 617, the financial institution may generate a pseudorandom check code sequence by any appropriate method known or used in the art. It is understood that a pseudorandom check code sequence algorithm should produce a pseudorandom check code sequence with a period that is long enough so that a finite sequence of reasonable length is not periodic, and where each unique pseudorandom check code is not repeated within the same checkbook so that customers can easily reconcile their checks with the financial institution. In a preferred embodiment, the generated pseudorandom check code sequence is cryptographically secure as described above. In an embodiment, at block 617, a third party check provider or check printing service provider may generate an identical pseudorandom check code sequence for the customer requested checkbook at block 213. It is understood that the financial institution and third party check provider or check printing service provider should use identical pseudorandom check code sequence generating algorithms, identical pseudorandom sequence generators in synchronism and an identical seed previously supplied in advance of the pseudorandom check code sequence generation. In an embodiment, the pseudorandom check code sequences generated by the financial institution and third party check provider or check printing service provider may be verified by any secure communication method known in the art including secure communication methods employing asymmetric or symmetric encryption techniques, message authentication codes, secure hashing algorithms, and/or, as discussed above, a combination thereof using, for example, a network security protocol known in the art such as SSL or TLS where the information sent between the financial institution and third party check provider or check printing service provider is encrypted.

At block 619, a unique pseudorandom check code of the generated pseudorandom check code sequence is associated with each of the checks of the plurality of checks in the checkbook by the financial institution, third party check provider or third party check printing service provider. At block 621, in embodiments including a compilation of paper financial instruments, such as a paper checkbook, each of the plurality of paper checks, including the associated unique pseudorandom check code of the generated pseudorandom check code sequence, in the checkbook, is printed, assembled and united into a booklet form by the financial institution, third party check provider or third party check printing service provider as requested by the customer at block 213. In embodiments including a compilation of electronic financial instruments, such as an electronic checkbook, each of the plurality of electronic checks, including the associated unique pseudorandom check code of the generated pseudorandom check code sequence, in the checkbook, is created, electronically assembled and electronically united into an electronic checkbook file by the financial institution, third party check provider or third party check printing service provider at block 621, as requested by the customer at block 213.

Figure 7:
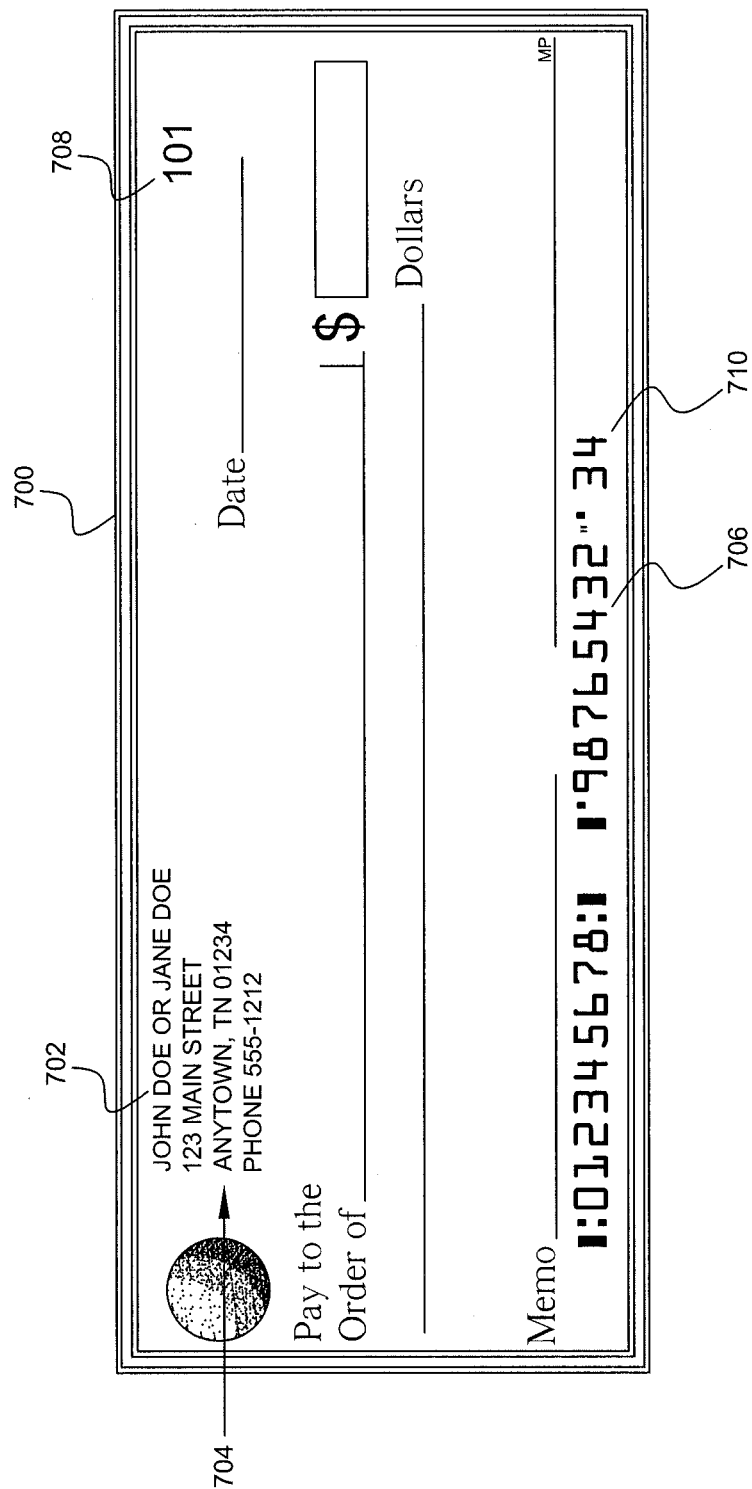
FIG. 7 is an illustrative example of a paper check according to an embodiment of the present disclosure.

With reference to FIG. 7, an example of a check including a unique pseudorandom check code 708 of the present invention is illustrated. Standard indicia on check 700 includes a customer name 702, a customer address 704, a customer account number 706 printed on the check in traditional Magnetic Ink Character Recognition (MICR) format, and a check sequence number 708. The check sequence number 708 may be included on the check for the convenience of the customer such as for use in balancing the customer's checkbook. Unique pseudorandom check code 710 is illustrated as a MICR line check number printed adjacent to customer account number 706. However, one skilled in the art would understand that unique pseudorandom check code 710, as illustrated, represents only an exemplary form of a unique pseudorandom check code that is contemplated by the present disclosure.

In an embodiment, at block 623, the activation code generated at block 215 is issued to an address of the customer stored or possessed by the financial institution at, for example, records or files at data storage units 154, 156. The address of the customer may include, but is not limited to, a physical mailing address or electronic mailing address. In an embodiment, the customer may be requested to verify the physical mailing address or electronic mailing address that is stored or possessed by the financial institution prior to requesting or ordering a checkbook at block 213. In an exemplary embodiment using a paper checkbook, the activation code may be mailed to an address of the customer stored by the financial institution, third party check provider or third party check printing service provider with the printed checkbook that was ordered by the customer at block 213 and assembled by the financial institution, third party check provider or third party check printing service provider at block

621. As formerly discussed, the activation code may be printed on a card or a sticker with instructions to the customer such as, for example, "Use the below code to activate your checkbook". The card or sticker may also include instructions for contacting the financial institution to activate the checkbook including, but not limited to, a website address, secure electronic mailing address, or telephone number, and instructions for activating the checkbook once contact has been established with the financial institution.

At block 625, the activation code generated for the customer's checkbook at block 215 is associated with each of the unique pseudorandom check codes of the generated pseudorandom sequence associated with each of the plurality of checks in the checkbook at block 619. As discussed above, the generated activation code is unique to the plurality of checks in the checkbook ordered by the customer at block 213. At block 625, the activation code generated for the customer's checkbook at block 215 may be associated with identifying information for the customer. The identifying information for the customer may be stored in records or files possessed by, or stored at, the financial institution, including, but not limited to, at data storage units 154, 156. In another embodiment, the customer's identifying information may be stored in records or files possessed by, or stored at, a third party check provider or third party check printing service provider. At block 627, the generated activation code may be stored in the appropriate customer's records or files possessed by, or stored at, the financial institution. with at least a portion of the customer identifying information and each of the unique pseudorandom check codes of the generated pseudorandom sequence associated with each of the plurality of checks in the checkbook at block 619. In another embodiment, at block 423, the activation code, customer identifying information, and each of the unique pseudorandom check codes of the generated pseudorandom sequence associated with each of the plurality of checks in the checkbook at block 619 may be stored in the appropriate customer's records or files possessed by, or stored at, a third party check provider.

Figure 8:
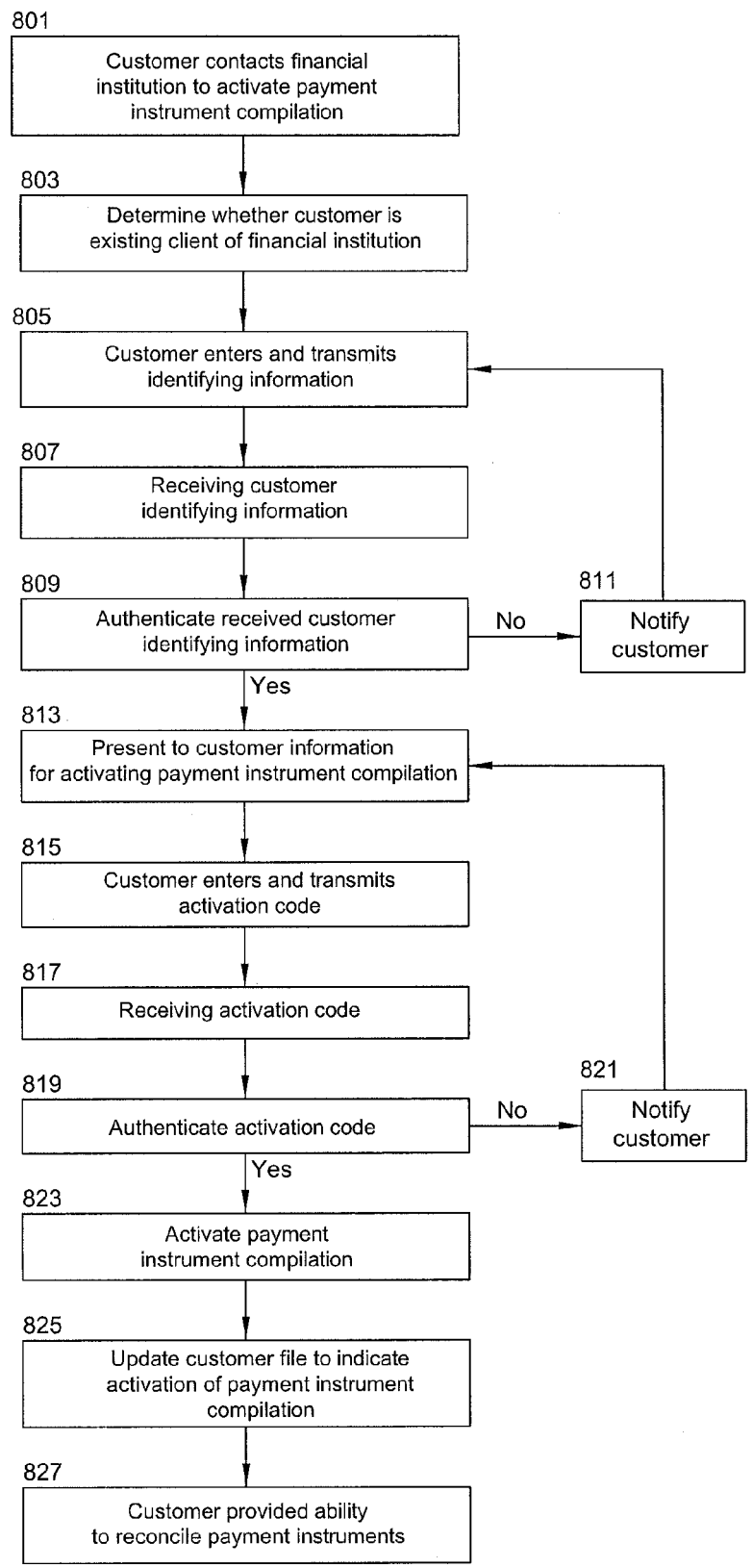
FIG. 8 is a flow chart showing a method for activating a compilation of payment instruments according to an embodiment of the present disclosure.

FIG. 8 illustrates a flow chart for activating a compilation of payment instruments according to an embodiment of the present disclosure. In FIG. 8, at block 801 a customer may contact a financial institution to activate a compilation of payment instruments, such as a checkbook, that may have been issued to the customer by the financial institution, third party check provider or third party check printing service provider as formerly discussed. In an embodiment, an activation code unique to a checkbook is issued by a financial institution, third party check provider or third party check printing service provider and received by the customer with the corresponding checkbook. In an alternate embodiment, a customer may contact a financial institution to activate a checkbook after receiving an activation code unique to an electronic checkbook. One skilled in the art will recognize that the customer may activate a checkbook by contacting the financial institution through a wide variety of methods including, but not limited to, telephone, electronic mail, physical mail or by entering the financial institution's electronic system for online checkbook activation. As described above, the financial institution's electronic system for online checkbook activation may be a website provided by the financial institution's online banking access system 150 that the customer may access via a public or private network. The customer may enter the website a number of ways (i.e. the customer's entrance into the financial institution's website may be "path sensitive", which may have implications as discussed further below) such as via a public network, via a link from another account the customer may have with the financial institution, via a notice or alert sent to the customer by the financial institution, via an e-mail advertisement sent to the customer by the financial institution, in response to a receipt of a promotional advertisement, etc.

At block 803, a determination may be made as to whether the customer is an existing client of the financial institution. In an embodiment, a determination may be made as to whether the customer is an existing online client of the financial institution. This determination may be based on information from block 801 or other information provided by the customer or from another source, including records or files possessed by, or stored at, the financial institution, including, but not limited to, at data storage units 154, 156. In an embodiment, the determination at block 803 may be made as to whether the customer is an existing offline client of the financial institution or both an online and offline client of the financial institution. If the customer is an existing online client of the financial institution, then at block 805, the customer enters and transmits information for identifying the customer, such as, for example, a username and password. This information may typically be entered and transmitted to the financial institution using a computer such as, for example, through customer's terminal 108, 110 or local computer 164. Alternatively, as would be understood by those of skill in the art, other information for identifying the customer may be entered or used in place of a username and password. In an embodiment, since the customer is an existing online client of the financial institution, only a limited amount or portion of information need be entered by the customer. In an exemplary embodiment, the information sent between the customer and the financial institution is encrypted using a network security protocol known in the art such as, for example, Secure Socket Layer (SSL) or Transport Layer Security (TLS). If the customer is an existing offline client of the institution, the customer provides or transmits information for identifying the customer, at block 805, such as, for example, the customer's name, customer's mailing address, the customer's electronic mailing address, the customer's account number, the customer's social security number, the customer's bank's name, the customer's bank identification number, the customer's bank's routing transit number, telephone call-in information assigned to the customer by the financial institution or selected by the customer during account set-up, a call-in password, a call-in PIN, or any combination thereof. In an embodiment, since the customer is an existing offline client of the financial institution, only a limited amount or portion of information need be transmitted by the customer to the financial institution.

At block 807, the information provided by the customer at block 805 may be received by the financial institution based on the method for transmission employed by the customer at block 805. At block 809, the customer identifying information received by the financial institution at block 807 may be authenticated by any appropriate method known in the art. For example, the customer identifying information may be compared to identifying information stored for the customer in records or files possessed by, or stored at, the financial institution, including, but not limited to, at data storage units 154, 156. If the received customer identifying information is not authenticated, the financial institution may inform the customer that the information provided at block 805 is incorrect by any appropriate method known in the art including, for example, by displaying an error message on the customer's computer screen at block 811 and looping the process back to block 805. If the customer identifying information received by the financial institution at block 807 is authenticated, then the financial institution may, at block 813, present to the customer (e.g. by displaying information on a webpage presented to the customer) at, for example, the customer's terminal 108, 110 or local computer 164, information for activating a compilation of payment instruments. In an embodiment, the financial institution may provide to the customer, at block 813, information for activating a checkbook by telephone, electronic mail, physical mail, or any other correspondence mechanism.

The information for activating a checkbook presented to the customer at block 813 may be dynamically presented based at least partially on the information provided by the customer at block 801 or 805 or from another source, including records or files possessed by, or stored at, the financial institution, including, but not limited to, at data storage units 154, 156. For example, the information for activating the checkbook may include a checkbook issued for one or more types of accounts held by the customer at the financial institution including, but not limited to, a savings account, checking account, money market account, etc. In an embodiment, the information for activating the checkbook may include the name of the primary account holder, the name of a joint account holder, an account number of a checking, savings, money market or other account, a physical or electronic mailing address of the customer, terms and conditions for activating the checkbook, etc. The terms and conditions, as is known in the art, typically includes information appropriate for a product to be activated by a customer, in this case at block 813, and may include information, such as, but not limited to, minimum balance requirements, payment rules, interest rates charged, overdraft charges, late fee applicability, etc.

Figure 9:
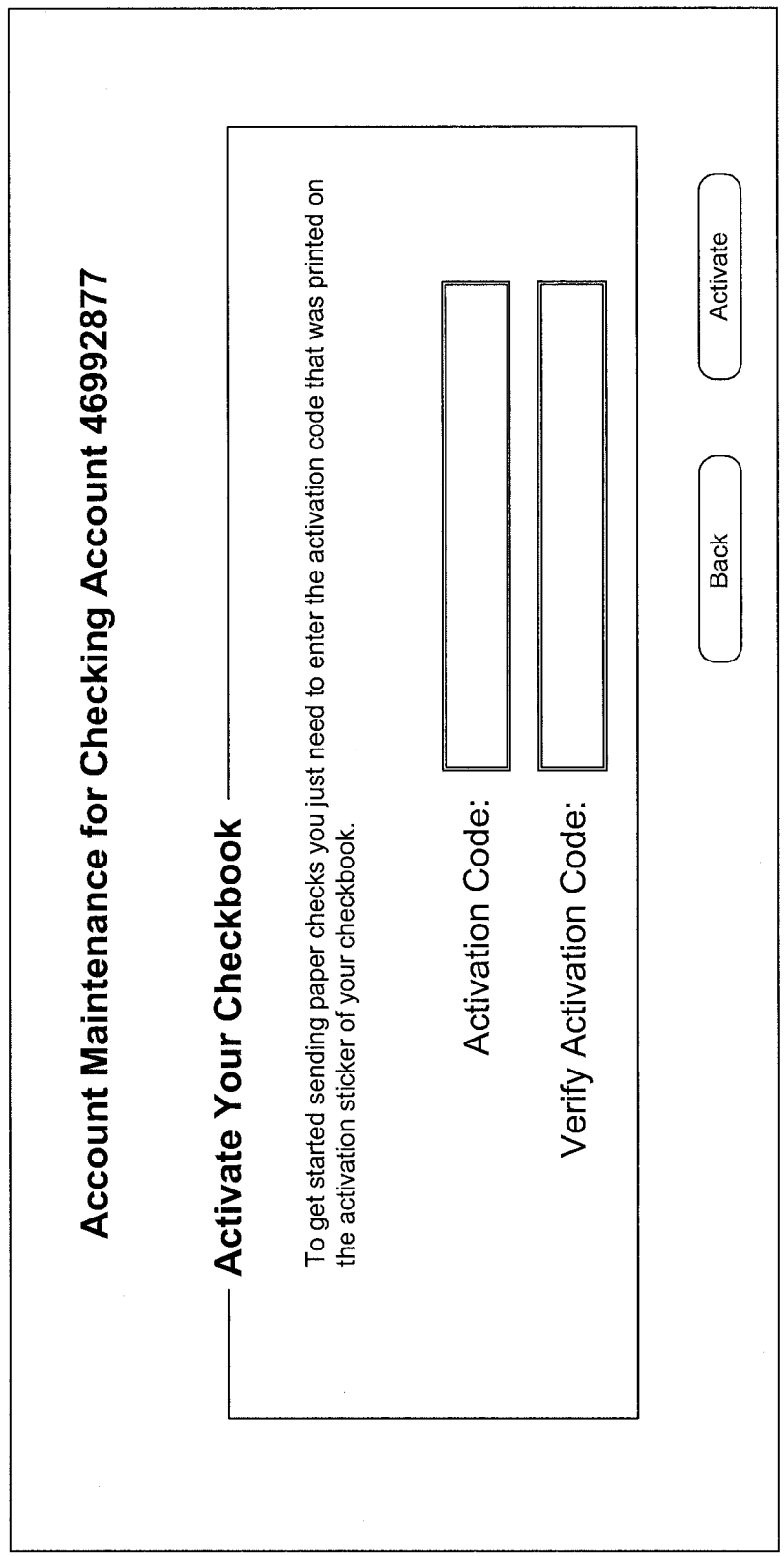
FIG. 9 is an illustrative website screenshot according to an embodiment of the present invention.

With reference to FIG. 9 illustrating an exemplary example of a website screenshot according to an embodiment of the present invention, the customer may be asked to enter and verify the accuracy of the activation code that was issued to the customer with the checkbook at blocks 419 or 623. In an embodiment, the customer may be requested to verify the accuracy of other information presented at block 813 and/or accept terms and conditions presented at block 813 prior to activating the checkbook. In a further embodiment, the customer may perform edits to the information presented at block 813 to ensure accuracy. In another embodiment, the information for activating the checkbook may include a link to a third party provider site, including but not limited to, a check provider. At block 815, the customer transmits to the financial institution, or check provider, the activation code issued to the customer. If the customer is an existing online client of the financial institution, then at block 815, the customer may enter and transmit the activation code using a computer such as, for example, through customer's terminal 108, 110 or local computer 164. If the customer is an existing offline client of the financial institution, then at block 815, the customer may transmit the activation code using a wide variety of methods including, but not limited to, telephone, electronic mail, or physical mail.

At block 817, the activation code provided by the customer at block 815 may be received by the financial institution based on the method for transmission employed by the customer at block 815. At block 819, the activation code received by the financial institution at block 817 may be authenticated by any appropriate method known in the art. For example, the activation code may be compared to an activation code stored for the customer in records or files possessed by, or stored at, the financial institution, including, but not limited to, at data storage units 154, 156. If the received activation code is not authenticated, the financial institution may inform the customer that the activation code provided at block 815 is incorrect by any appropriate method known in the art including, for example, by displaying an error message on the customer's computer screen at block 821 and looping the process back to block 815. If the activation code received by the financial institution at block 817 is authenticated, then the financial institution may, at block 823, activate the checkbook associated with the stored activation code, for example, at blocks 421 and 625. In an embodiment, the financial institution may present to the customer (e.g. by displaying information on a webpage presented to the customer) at, for example, the customer's terminal 108, 110 or local computer 164, information indicating that the checkbook associated with the stored activation code has been activated. At block 825, the financial institution may update the authenticated customer's records or files possessed by, or stored at, the financial institution, including, but not limited to, at data storage units 154, 156, to indicate that the checkbook associated with the stored activation code has been activated. At block 827, the customer may be able to obtain information and details of each check of the plurality of checks in the activated checkbook by contacting the financial institution through a wide variety of methods including, but not limited to, telephone, electronic mail, physical mail or by entering and accessing the financial institution's electronic system for online banking. Thus, for example, a customer may be able to reconcile each of the plurality of checks in the activated checkbook online on the financial institution's website. In an embodiment, a customer may be able to contact the financial institution to obtain, retrieve and/or view information or details on each of the plurality of checks in the activated checkbook at a variety of stages during the life of a check, for example, cashed checks, outstanding checks or voided checks, online on the financial institution's website. A customer may also be provided with the capability to actively reconcile each of the plurality of checks in the activated checkbook through a financial institution or check service provider. For example, a customer may be provided with the capability to stop payment of a check, void a check, cancel one or more of the plurality of outstanding checks in the activated checkbook online using, for example, the financial institution's website.

Figure 10:
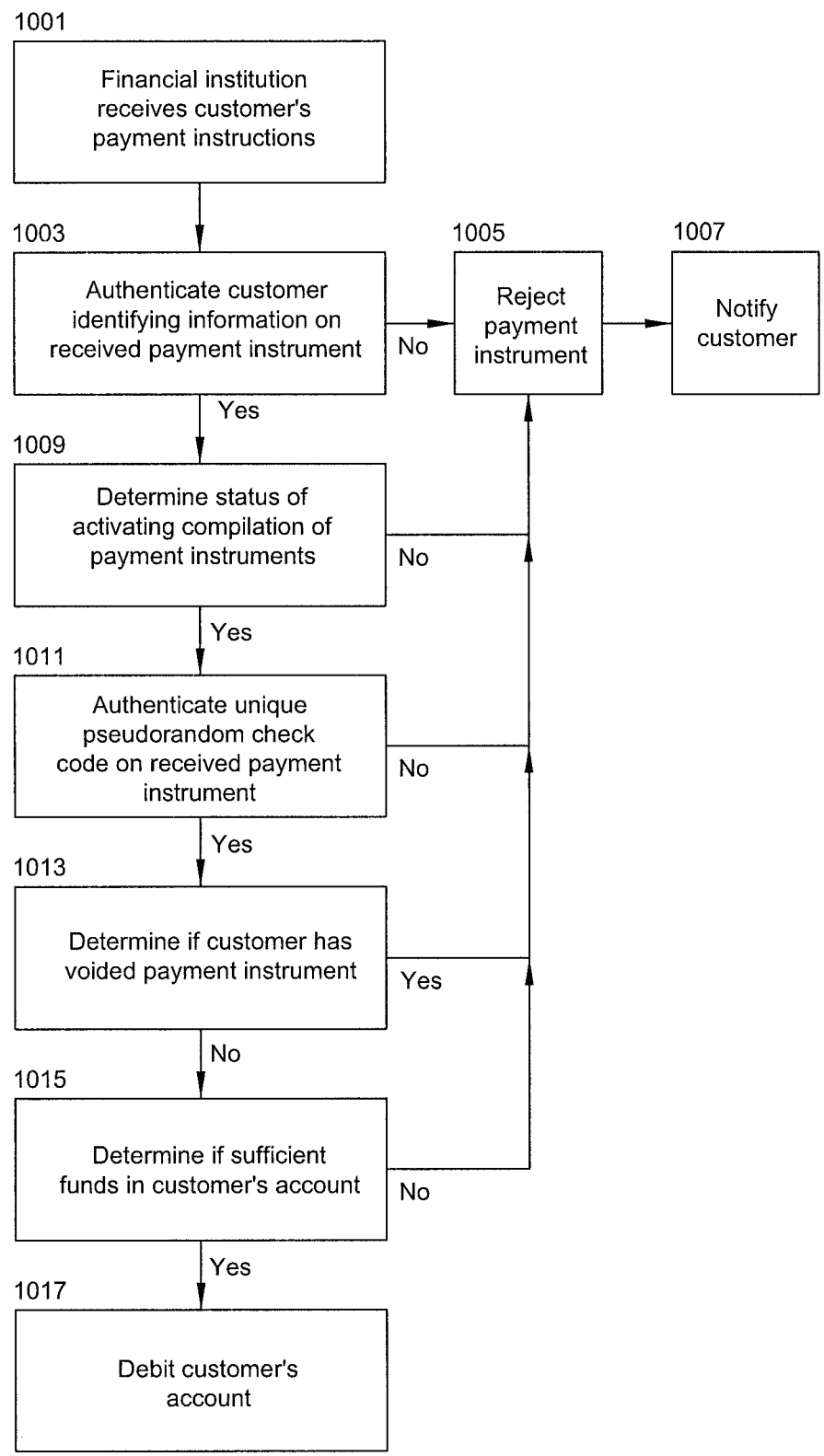
FIG. 10 is a flow chart for authenticating a received payment instrument according to an embodiment of the present disclosure.
Figure 11:
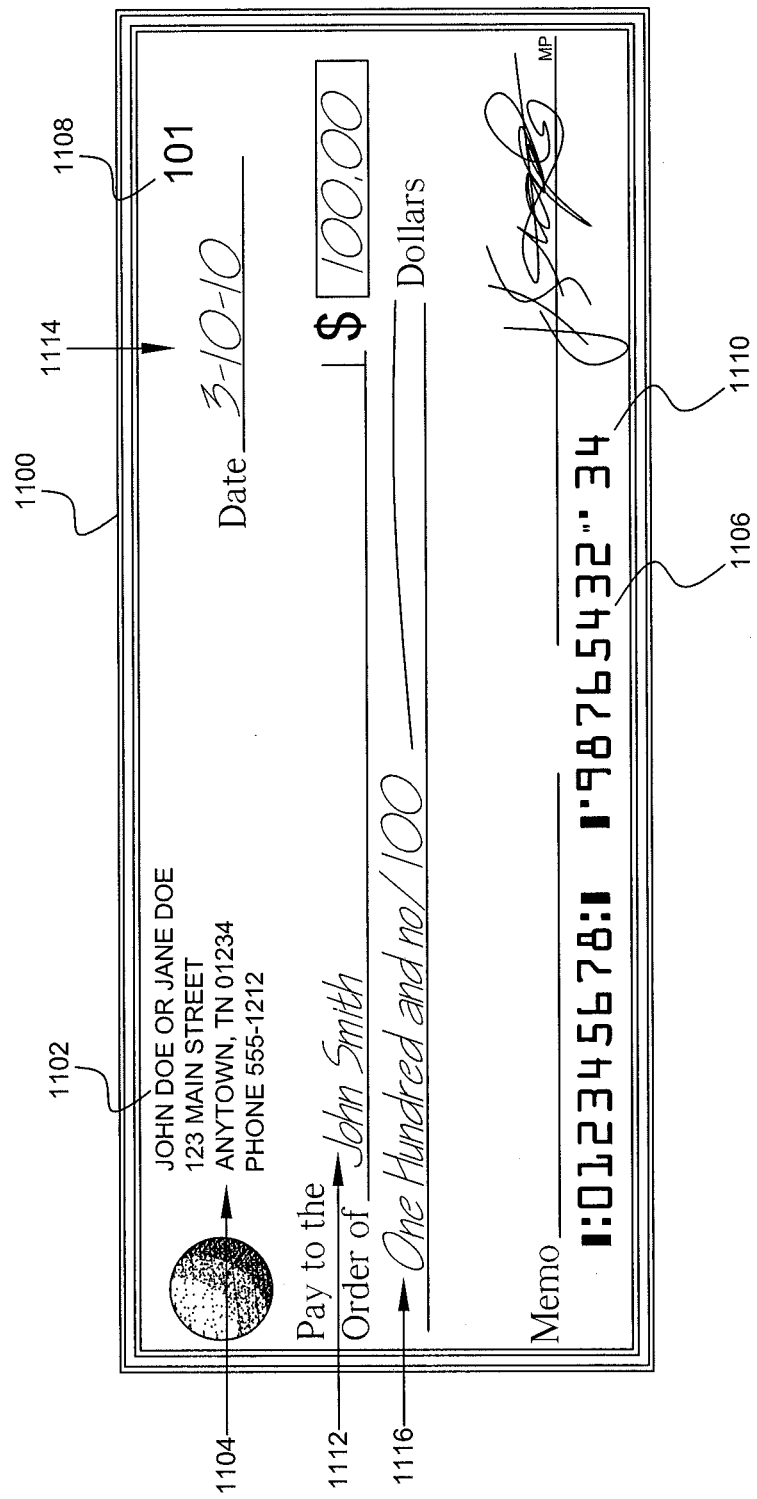
FIG. 11 is an illustrative example of a paper check according to an embodiment of the present disclosure.

With reference now to FIG. 10, a flow chart for authenticating a received payment instrument according to an embodiment of the present disclosure is illustrated. At block 1001, a financial institution receives a customer's check. For example, and as shown in FIG. 11, the check may include a customer name 1102, a customer address 1104, a customer account number 1106, a check sequence number 1108, a unique pseudorandom check code 1110, and transaction-related information such as a payee name 1112, a date 1114, and an amount 1116. As discussed above, the check may be a paper check or an electronic check. In an embodiment, a customer may have previously provided the check to a third party. The third party may be a company or person to whom the customer owes a debt or desires to make a payment. For example, the customer may provide a paper check to a utility company to cover a monthly bill or to a friend or relative as a gift. In an embodiment, the customer may provide an electronic check to one or more payees to satisfy a debt or make a payment. One skilled in the art will recognize that the customer may provide a check through a wide variety of methods including, but not limited to, telephone, electronic mail, physical mail, by submitting a bill payment request through a financial institution's electronic system for online bill payment, or by providing a check directly to a third party. In an embodiment using electronic systems for online bill payment, a financial institution or check service provider may provide a paper check or electronic check based on the customer's online bill payment request to a third party on behalf of the customer. In an another embodiment, the customer may submit a request to create a paper check from an electronic check through a financial institution's website displayed on, for example, a customer's terminal 108, 110 or to local computer 164 at the customer's home, office or other location. In an embodiment, the third party may deposit the check in a financial institution of the third party, such as for example, a bank of first deposit. One skilled in the art would understand that a bank of first deposit may include any financial institution where a customer's check is initially deposited to an account. For example, if the check is drawn on another financial institution or bank, the collecting bank may present the check directly to a paying financial institution or the collecting bank may present the check to a correspondent bank or clearinghouse corporation, or to the Federal Reserve Bank for settlement against a paying financial institution's reserve account. One skilled in the art would also understand that a Federal Reserve Bank may be any of the regional banks in the Federal Reserve System. In an embodiment, the bank of first deposit may scan the deposited check and send an electronic image of the deposited check, or a substitute check, to a paying financial institution or Federal Reserve Bank as appropriate. In an embodiment including a Federal Reserve Bank, the Federal Reserve Bank may process the check and send an electronic image, or substitute check, to the paying bank through, for example, the Federal Reserve's Automated Clearing House (ACH) system. In an embodiment, a correspondent bank or clearinghouse corporation may process the check through an electronic check processing system such as, for example, FedWire or Clearing House Interbank Payment System (CHIPS).

At block 1003, the financial institution may authenticate the customer identifying information on the received check 1100 by any appropriate method known in the art. For example, the customer identifying information on the received check 1100 may be compared to identifying information for the customer in records or files possessed by, or stored at, the financial institution, including, but not limited to, at data storage units 154, 156. If the customer identifying information on the received check 1100 is not authenticated, the financial institution may reject the check at block 1005 by any appropriate method known in the art. In an embodiment, the financial institution may send a received substitute check, or received scanned image of the electronic check, back to its originator such as, for example, the bank of first deposit, Federal Reserve Bank, correspondent bank or clearinghouse corporation that processed the check. If the financial institution rejects the check, the financial institution may, at block 1007, notify the customer of the rejected check by any appropriate method. In an embodiment, the financial institution may take additional measures to enhance the security of the customer's account. For example, the financial institution may review a risk assessment stored for the customer or force the customer to modify customer identifying information to include, for example, a username, a password, website login information assigned to the customer by the financial institution or selected by the customer when creating an online account with the financial institution, a personal identification number (PIN), telephone call-in information assigned to the customer by the financial institution or selected by the customer during account set-up, a call-in password, or a call-in PIN.

If the customer identifying information on the received check 1100 is authenticated, the financial institution may, at block 1009, determine the status of activating a checkbook for the authenticated customer. In an embodiment, the financial institution may determine the status of activating a checkbook for the authenticated customer by comparing at least a portion of the customer identifying information for the authenticated customer stored in records or files possessed by the financial institution with at least a portion of the customer identifying information on the received check and by reviewing the status of the stored activation code. In an exemplary embodiment, the financial institution may determine the status of activating a checkbook for the authenticated customer by determining if the activation code stored in records or files possessed by the financial institution has been updated to indicate that it was activated by the authenticated customer as described above. For example, the financial institution may determine the status of activating a checkbook for the customer by comparing the customer's name and account number on the received check to the stored customer name and customer account number to determine that the customer is authentic and by determining if the stored activation code has been updated to indicate that it was activated by the associated customer that was previously authenticated. In an alternate embodiment, the financial institution may simply determine the status of activating a checkbook for the authenticated customer using the stored activation code associated with the authenticated customer. If the authenticated customer is determined to not have an activated checkbook, the financial institution may reject the check by looping back to block 1005.

If the authenticated customer is determined to have an activated checkbook, the financial institution may, at block 1011, authenticate the unique pseudorandom check code on the received check using the stored information for identifying the customer, at least a portion of the information for identifying the customer on the received check and by comparing the unique pseudorandom check code on the received check with the stored unique pseudorandom check codes of the pseudorandom sequence associated with the authenticated customer. In an exemplary embodiment, the financial institution may authenticate the unique pseudorandom check code on the received check by comparing it with the stored unique pseudorandom check codes of the pseudorandom sequence associated with the authenticated customer to determine if the received check pseudorandom check code matches one of the stored unique pseudorandom check codes for the activated checkbook. If the received check pseudorandom check code does not match one of the stored unique pseudorandom check codes for the activated checkbook associated with the authenticated customer, the financial institution may reject the check by looping back to block 1005. However, if the customer identifying information and the unique pseudorandom check code included on the received check are authenticated, and the checkbook for the authenticated customer is determined to be activated, then the received check is determined to be authentic.

In an embodiment, and as discussed above, a customer may be provided with the capability to actively reconcile each of the plurality of checks in the activated checkbook through a financial institution or check service provider, including the capability to stop payment of a check, void a check, or cancel one or more of the plurality of outstanding checks in the activated checkbook online or offline using, for example, the financial institution's online banking website. If the customer has previously communicated to the financial institution his desire to void, cancel or stop payment for the received check, the financial institution may determine this fact, at block 1013, by comparing check identifying information including, for example, the check sequence number for the received check, at least a portion of the customer identifying information on the received check, and/or the unique pseudorandom check code number for the received check with the corresponding information stored in records or files possessed by the financial institution for the authenticated customer. If the authenticated customer is determined to have previously voided, cancelled or ordered payment stopped for the received check, the financial institution may reject the check by looping back to block 1005.

In an embodiment, if the authenticated customer is determined to have taken no prior action to reconcile the received check, and if the received check has been authenticated, the financial institution may, at block 1017, debit or release the amount of the authenticated customer's funds from the account associated with the received authenticated check. In another embodiment, at block 1015, the amount 1116 on the received authenticated check is compared with an account balance for the authenticated customer to determine if the authenticated customer has sufficient funds in the appropriate account to cover the received authenticated check. If the balance is determined to be insufficient, the financial institution may reject the check by looping back to block 1005. However, if the balance is determined to be sufficient, the financial institution may then, at block 1017, debit or release the amount of the customer's funds from the customer's account associated with the received authenticated check. As discussed above, the customer may be able to obtain information and details of each check of the plurality of checks in the activated checkbook by contacting the financial institution through a wide variety of methods including, but not limited to, telephone, electronic mail, physical mail or by entering and accessing the financial institution's electronic system for online banking. The customer may also be able to obtain information and details of the status of each of the customer's accounts by using similar methods known in the art.

As shown by the various configurations and embodiments illustrated in FIGS. 1-11, a system and method for securing financial information have been described.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for securing financial information, comprising:
   a) generating a pseudorandom number sequence using a pseudorandom number generator;
   b) generating, using a computer processor, an activation code as a unique pseudorandom code for a plurality of checks;
   c) including a unique pseudorandom number of the sequence with each check of the plurality of checks, wherein the respective unique pseudorandom number of the sequence included with a respective check is to verify the authenticity of the respective check; and
   d) issuing the plurality of checks with the activation code to a first party;
   e) associating the activation code with each of the unique pseudorandom numbers of the pseudorandom number sequence included on each check of the plurality of checks;
   f) associating the activation code with information for identifying the first party; and
   g) storing the activation code with each of the unique pseudorandom numbers of the pseudorandom number sequence included on each check of the plurality of checks and the information for identifying the first party in a file of a second party.

2. The method of claim 1, further comprising:
activating the plurality of checks with the activation code.

3. The method of claim 2, further comprising:
verifying the authenticity of a check of the plurality of checks using the activation code.

4. The method of claim 3, further comprising:
verifying the authenticity of a check of the plurality of checks using the unique pseudorandom number of the sequence included with the check.

5. The method of claim 1, further comprising:
   h) transmitting at least a portion of the information for identifying the first party to the second party;
   i) transmitting the activation code to the second party;
   j) receiving the at least a portion of the information for identifying the first party;
   k) receiving the activation code;
   l) authenticating the first party using the received at least a portion of the information for identifying the first party and at least a portion of the stored information for identifying the first party;
   m) authenticating the received activation code with the stored activation code; and
   n) activating the plurality of checks if the first party and the received activation code are authenticated.

6. The method of claim 5, further comprising:
   a) receiving a check of the plurality of checks having at least a portion of the information for identifying the first party and the unique pseudorandom number of the sequence included with the check;
   b) determining a status of activating the plurality of checks using the at least a portion of the information for identifying the first party on the received check, the stored activation code, and at least a portion of the stored information for identifying the first party;
   c) authenticating the first party using the received at least a portion of the information for identifying the first party and at least a portion of the stored information for identifying the first party;
   d) authenticating the unique pseudorandom number of the sequence included with the received check using the received at least a portion of the information for identifying the first party, at least a portion of the stored information for identifying the first party and the stored unique pseudorandom numbers of the pseudorandom number sequence; and
   e) authenticating the received check of the plurality of checks if the first party and the unique pseudorandom number of the sequence included with the received check are authenticated and if the plurality of checks have been activated.

7. The method of claim 6, further comprising:
debiting an account of the first party if the received check of the plurality of checks is authenticated.

8. The method of claim 7, further comprising:
displaying the status of the account of the first party to the first party.

9. The method of claim 5 wherein the transmitted at least a portion of the information for identifying the first party is selected from the group consisting of: the first party's name, the first party's account number, the first party's bank's name, the first party's bank identification number, the first party's routing transit number, the first party's user name and password for a website, and website login information assigned to the first party by the second party.

10. The method of claim 9, wherein the transmitted at least a portion of the information for identifying the first party includes website login information assigned to the first party by the second party.

11. The method of claim 1, further comprising:
   a) displaying a status of activating the plurality of checks with the activation code to the first party; and
   b) displaying a status of each check of the plurality of checks to the first party.

12. The method of claim 1, wherein the activation code is alphanumeric.

13. The method of claim 1, wherein the check is an paper check.

14. The method of claim 1, wherein the check is an electronic check.

15. A system for securing financial information, comprising:
   a) a computer processor having a computer readable storage medium, the computer readable storage medium comprising instructions stored therein for executing on said processor, the instructions, when read and executed, for causing the processor to:
      i. generate an activation code as a unique pseudorandom code for a plurality of checks;
      ii. generate a pseudorandom number sequence;
      iii. include a unique pseudorandom number of the sequence with each check of the plurality of checks, wherein the respective unique pseudorandom number of the sequence included with a respective check is used to verify the authenticity of the respective check;
      iv. associate the activation code with each of the unique pseudorandom numbers of the pseudorandom number sequence included with each check of the plurality of checks;
      v. associate the activation code with information for identifying the first party;
      vi. store the activation code with each of the unique pseudorandom numbers of the pseudorandom number sequence included with each check of the plurality of checks and the information for identifying the first party in a file of a second party; and
      vii. activate the plurality of checks with the activation code; and
   b) a means for issuing the plurality of checks with the activation code to a first party.

16. The system of claim 15, the computer readable storage medium further comprising computer-executable instructions stored therein for causing said processor to:
   verify the authenticity of a check of the plurality of checks using the activation code.

17. The system of claim 16, the computer readable storage medium further comprising computer-executable instructions stored therein for causing said processor to:
   verify the authenticity of a check of the plurality of checks using the unique pseudorandom number of the sequence included with the check.

18. The system of claim 15, further comprising:
   a) a transmitter to transmit at least a portion of the information for identifying the first party to the second party;
   b) a transmitter to transmit the activation code to the second party;
   c) a receiver to receive the at least a portion of the information for identifying the first party;
   d) a receiver to receive the activation code;
   the computer readable storage medium further comprising computer-executable instructions stored therein for causing said processor to:
   a) authenticate the first party using the received at least a portion of the information for identifying the first party and at least a portion of the stored information for identifying the first party;
   b) authenticate the received activation code with the stored activation code; and
   c) activate the plurality of checks if the first party and the received activation code are authenticated.

19. The system of claim 18, further comprising:
   a) a receiver to receive a check of the plurality of checks having at least a portion of the information for identifying the first party and the unique pseudorandom number of the sequence included with the check;
   the computer readable storage medium further comprising computer-executable instructions stored therein for causing said processor to:
   a) determine a status of activating the plurality of checks using the at least a portion of the information for identifying the first party, the stored activation code, and at least a portion of the stored information for identifying the first party;
   b) authenticate the first party using the received at least a portion of the information for identifying the first party and at least a portion of the stored information for identifying the first party;
   c) authenticate the unique pseudorandom number of the sequence included with the received check using the received at least a portion of the information for identifying the first party, at least a portion of the stored information for identifying the first party and the stored unique pseudorandom numbers of the pseudorandom number sequence; and
   d) authenticate the received check of the plurality of checks if the first party and the unique pseudorandom number of the sequence included with the received check are authenticated and if the plurality of checks have been activated.

20. The system of claim 19, further comprising:
   a means for debiting an account of the first party if the received check of the plurality of checks is authenticated.

21. The system of claim 20, further comprising:
   a display to display the status of the account of the first party.

22. The system of claim 17, further comprising:
   a) a display to display a status of activating the plurality of checks with the activation code to the first party; and
   b) a display to display a status of each check of the plurality of checks to the first party.

23. The system of claim 16, wherein the activation code is alphanumeric.

24. A method for authenticating a check, comprising:
   a) generating a pseudorandom number sequence using a pseudorandom number generator;
   b) generating, using a computer processor, an activation code as a unique pseudorandom code for a plurality of checks;
   c) including a unique pseudorandom number of the sequence with each check of the plurality of checks;
   d) issuing the plurality of checks with the activation code to a first party;
   e) associating the activation code with each unique pseudorandom number of the pseudorandom number sequence included with each check of the plurality of checks;
   f) associating the activation code with information for identifying the first party;

g) storing the activation code with the pseudorandom number sequence and the information for identifying the first party in a file of a second party;

h) receiving a check of the plurality of checks having at least a portion of the information for identifying the first party and the unique pseudorandom number of the sequence included with the check;

i) determining a status of activating the plurality of checks using the at least a portion of the information for identifying the first party, the stored activation code, and at least a portion of the stored information for identifying the first party;

j) authenticating the first party with the received at least a portion of the information for identifying the first party and at least a portion of the stored information for identifying the first party;

k) authenticating the unique pseudorandom number of the sequence included with the check with the received at least a portion of the information for identifying the first party, the stored information for identifying the first party and the stored unique pseudorandom numbers of the pseudorandom number sequence; and l) authenticating the received check of the plurality of checks if the first party and the unique pseudorandom number of the sequence included with the check are authenticated and if the plurality of checks have been activated.

* * * * *